US009282205B2

(12) United States Patent
Sakaida (10) Patent No.: US 9,282,205 B2
(45) Date of Patent: Mar. 8, 2016

(54) ELECTRONIC APPARATUS, IMAGE FORMING APPARATUS, AND NON-TRANSITORY COMPUTER READABLE MEDIUM (71) Applicant: FUJI XEROX CO., LTD., Tokyo (JP)

(72) Inventor: Hiroshi Sakaida, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 143 days.

(21) Appl. No.: 14/096,785

(22) Filed: Dec. 4, 2013

(65) Prior Publication Data

US 2014/0307288 A1    Oct. 16, 2014

(30) Foreign Application Priority Data

Apr. 10, 2013    (JP) .................. 2013-082161

(51) Int. Cl.
*H04N 1/00*    (2006.01)
*H04L 12/10*    (2006.01)
*B41J 29/393*    (2006.01)
*G08B 21/00*    (2006.01)

(52) U.S. Cl.
CPC .................. *H04N 1/0035* (2013.01)

(58) Field of Classification Search
USPC ....................................................... 358/1.15
See application file for complete search history.

(56) References Cited

U.S. PATENT DOCUMENTS

| | | | |
|---|---|---|---|
| 6,927,866 B2 * | 8/2005 | Konishi | 358/1.13 |
| 7,551,306 B2 * | 6/2009 | Yoshizawa et al. | 358/1.15 |
| 7,755,779 B2 * | 7/2010 | Miura et al. | 358/1.13 |
| 8,127,031 B2 * | 2/2012 | Oya | G06F 3/1221 709/229 |
| 8,386,819 B2 * | 2/2013 | Mizunashi | H04L 12/10 358/1.13 |
| 2002/0184300 A1 * | 12/2002 | Schmeling et al. | 709/202 |
| 2003/0004917 A1 * | 1/2003 | Thomas et al. | 707/1 |
| 2003/0084462 A1 * | 5/2003 | Kubota et al. | 725/153 |
| 2004/0136017 A1 * | 7/2004 | Motoyama et al. | 358/1.9 |
| 2007/0019224 A1 * | 1/2007 | Okada et al. | 358/1.13 |
| 2007/0285704 A1 * | 12/2007 | Wu | 358/1.15 |
| 2008/0012892 A1 * | 1/2008 | Imoto | 347/19 |
| 2008/0267654 A1 * | 10/2008 | Kawai | 399/81 |
| 2010/0119250 A1 * | 5/2010 | Itoh | 399/81 |
| 2010/0238498 A1 * | 9/2010 | Okada et al. | 358/1.15 |
| 2012/0002237 A1 * | 1/2012 | Kurosawa | 358/1.15 |
| 2012/0041946 A1 * | 2/2012 | Oka | 707/722 |
| 2012/0268771 A1 * | 10/2012 | Kruizinga et al. | 358/1.14 |
| 2013/0335765 A1 * | 12/2013 | Ishiguro | H04N 1/00477 358/1.13 |
| 2014/0307288 A1 * | 10/2014 | Sakaida | 358/1.15 |

FOREIGN PATENT DOCUMENTS

| | | |
|---|---|---|
| JP | A-2005-159680 | 6/2005 |
| JP | A-2007-312122 | 11/2007 |

* cited by examiner

*Primary Examiner* — Marivelisse Santiago Cordero
*Assistant Examiner* — Daryl Jackson
(74) *Attorney, Agent, or Firm* — Oliff PLC

(57) ABSTRACT

Provided is an electronic apparatus including a first controller, a second controller controlled by the first controller, a device controlled by the second controller, and a storage area, wherein the second controller includes a detector, a situation data writing unit, an update notification transmission unit that transmits an update notification to the first controller, and a situation image data writing unit, and wherein the first controller includes a reading unit, a generating unit, a display unit, and a display completion notification transmission unit.

14 Claims, 10 Drawing Sheets

ELECTRONIC APPARATUS, IMAGE FORMING APPARATUS, AND NON-TRANSITORY COMPUTER READABLE MEDIUM

CROSS-REFERENCE TO RELATED APPLICATIONS

This application is based on and claims priority under 35 USC 119 from Japanese Patent Application No. 2013-082161 filed Apr. 10, 2013.

BACKGROUND

Technical Field

The present invention relates to an electronic apparatus, an image forming apparatus, and a non-transitory computer readable medium.

SUMMARY

According to an aspect of the invention, there is provided an electronic apparatus including:

a first controller;
a second controller that is controlled by the first controller;
a device that is controlled by the second controller; and
a storage area,
wherein the second controller includes:
a detector that detects a situation change of the device;
a situation data writing unit that writes situation data indicating the situation of the device in the storage area when the detector detects the situation change of the device;
an update notification transmission unit that transmits an update notification to the first controller if the writing to the storage area is performed; and
a situation image data writing unit that generates situation image data for displaying a situation image indicating the situation of the device when the detector detects the situation change of the device after the update notification transmission unit transmits the update notification and before a display completion notification indicating that display based on storage content of the storage area is completed is received from the first controller, and writes the situation image data in the storage area, and
wherein the first controller includes:
a reading unit that reads the situation data or the situation image data from the storage area when the update notification is received;
a generating unit that generates the situation image data for displaying the situation image based on the situation data when the reading unit reads the situation data;
a display unit that displays the situation image based on the situation image data generated by the generating unit or the situation image based on the situation image data read by the reading unit; and
a display completion notification transmission unit that transmits the display completion notification to the second controller if the display of the situation image in the display unit is completed.

BRIEF DESCRIPTION OF THE DRAWINGS

Exemplary embodiments of the present invention will be described in detail based on the following figures, wherein.

DETAILED DESCRIPTION

Hardware Configuration

Figure 1:
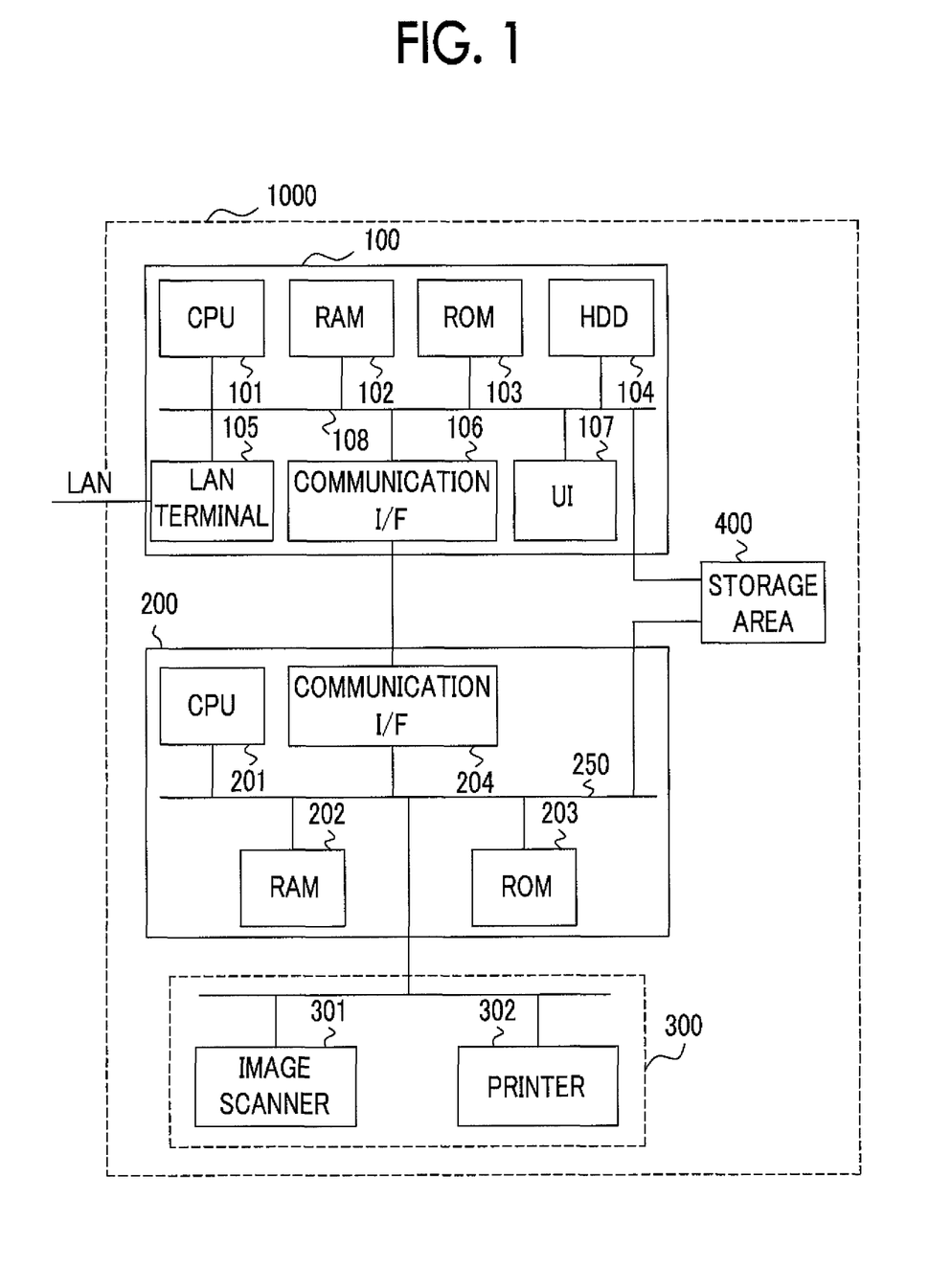
FIG. 1 is a diagram illustrating a hardware configuration of an image forming apparatus.

FIG. 1 is a diagram illustrating a hardware configuration of an image forming apparatus 1000. The image forming apparatus 1000 is an example of an electronic apparatus according to an exemplary embodiment of the invention. Main components of the image forming apparatus 1000 include a first controller (controller) 100, a second controller (device controller) 200, and a device 300. The first controller 100 executes Linux (registered trademark) as an operating system (CS), for example, and controls the second controller 200. The second controller 200 executes a real time OS (RTOS) as an OS, for example, and controls the device 300.

The first controller 100 includes a central processing unit (CPU) 101, a random access memory (RAM) 102, a read only memory (ROM) 103, a hard disk drive (HDD) 104, a local area network (LAN) terminal 105, a communication interface (I/F) 106, and a user interface (UI) 107. These components are connected to a bus 108.

The CPU 101 executes a program using the RAM 102 as a work area. A boot loader or the like is stored in the ROM 103. The OS, application programs and the like are stored in the HDD 104. A communication line is connected to the LAN terminal 105, and the CPU 101 performs communication with an external information processing apparatus or the like through a LAN. The communication I/F 106 is connected to a communication I/F 204 provided in the second controller 200 through a communication line. The UI 107 includes a keypad, a touch panel or the like (not shown), receives an operation of a user, and outputs a signal according to the received operation to the CPU 101. Further, an image that indicates a situation of the device 300 (hereinafter, referred to as a situation image) is displayed on the touch panel.

The second controller 200 includes a CPU 201, a RAM 202, a ROM 203 and the communication I/F 204. These components are connected to a bus 205. The OS is stored in the ROM 203. The CPU 201 reads the OS from the ROM 203 according to a command from the CPU 101 and executes the read OS.

The image forming apparatus 1000 includes one or more devices 300. The device 300 includes an image scanner 301, a printer 302 and the like, for example.

The image scanner 301 includes a light source, an optical system, an image sensor, and the like (not shown). The light source irradiates an original document with light, and light reflected by the original document is incident on the image sensor through the optical system. The image sensor generates a signal indicating an image of the original document and outputs the generated signal.

The printer 302 is a printer that prints an image by an electro-photographic method, and includes a print engine, an accommodating unit that accommodates a recording medium such as paper, a transport mechanism that transports the recording medium along a transport path, and the like (not shown). The printer 302 prints an image based on image data supplied through the second controller 200 from the first controller 100 on a recording medium.

A storage area 400 is a RAM, for example, and is accessed from both of the CPU 101 and a CPU 201. The storage area 400 may be provided on a substrate different from the first controller 100 or the second controller 200, or may be provided on any substrate of the first controller 100 and the second controller 200.

Functional Configuration

Figure 2:
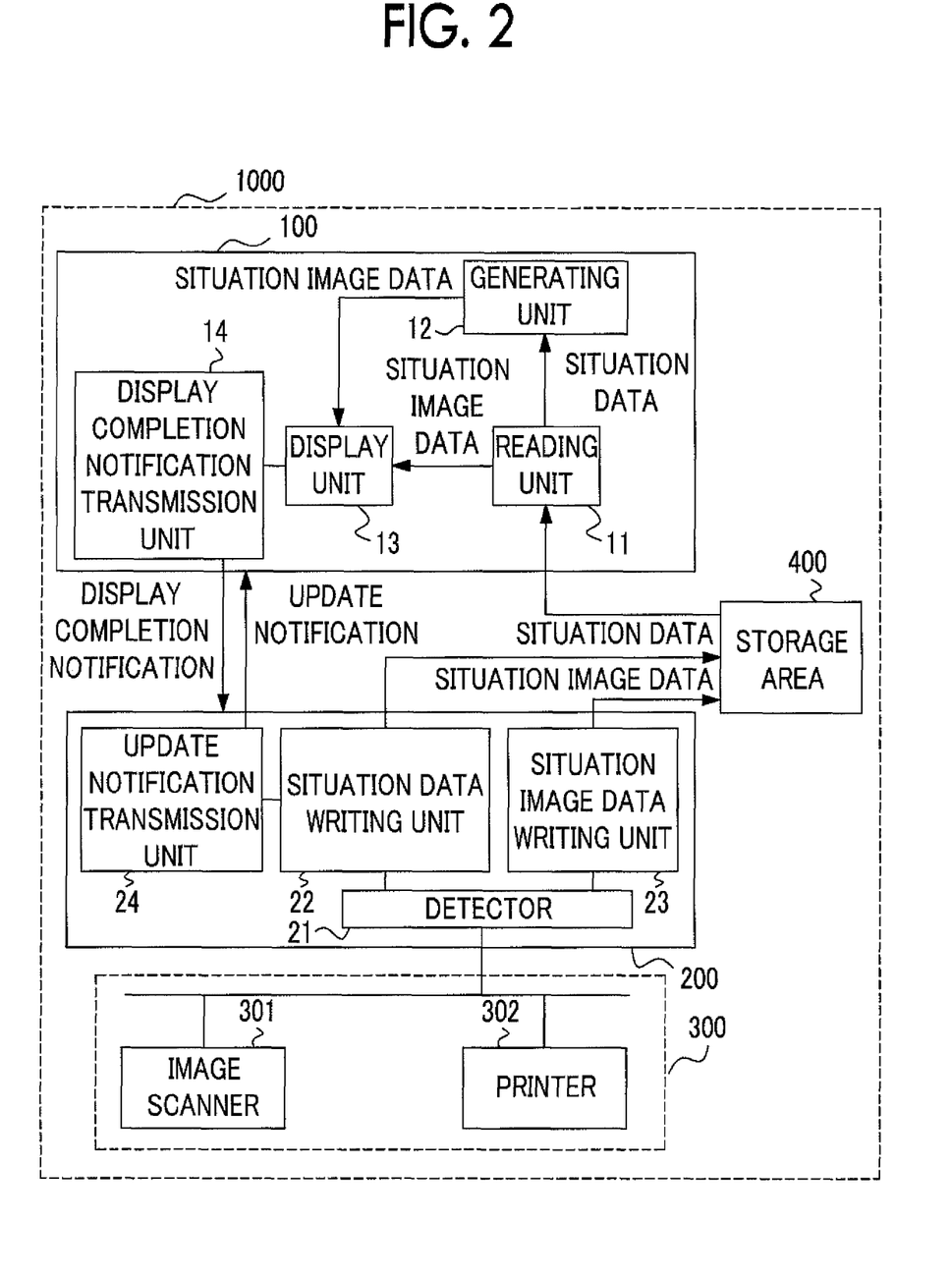
FIG. 2 is a diagram illustrating a functional configuration of the image forming apparatus.

FIG. 2 is a diagram illustrating a functional configuration of the image forming apparatus 1000.

The first controller 100 includes a reading unit 11, a generating unit 12, a display unit 13, and a display completion notification transmission unit 14. The second controller 200 includes a detector 21, a situation data writing unit 22, a situation image data writing unit 23, and an update notification transmission unit 24.

First, the second controller 200 will be described.

The detector 21 detects a situation change of the device 300. Specifically, the CPU 201 periodically obtains situation data indicating the situation of the device 300 from the device 300. For example, in the case of the printer 302, the situation data includes data for specifying an image that is being printed by the printer 302, data indicating the position of paper on the transport path of the printer, data indicating the amount of the remaining paper, and the like. The CPU 201 periodically obtains the situation data from the printer 302 to store the obtained situation data in the RAM 202, and compares the latest situation data with the situation data that is previously obtained, to thereby detect the situation change of the printer 302.

Next, the situation data writing unit 22 will be described. If the detector 21 detects the situation change of the device 300, the situation data writing unit 22 writes the situation data indicating the situation of the device 300 in the storage area 400. Specifically, if the situation change of the device 300 is detected, the CPU 201 reads the latest situation data stored in the RAM 202 and writes the read data in the storage area 400. Here, the CPU 201 sets a data type flag "0" that indicates the type of data in a specific bit of the situation data, for example, so that the corresponding data is recognized as the situation data.

Next, the update notification transmission unit 24 will be described. The update notification transmission unit 24 transmits an update notification to the first controller 100 if the writing to the storage area 400 is performed. Specifically, the data written in the storage area 400 corresponds to any of the above-described situation data and situation image data. The situation image data refers to image data for displaying an image that indicates the situation of the device 300 (details thereof will be described later). If the situation data or the situation image data is written in the storage area 400, the CPU 201 transmits the update notification to the first controller 100.

Here, if the situation data or the situation image data is written in the storage area 400 after the update notification is transmitted and before the display completion notification is received, the update notification transmission unit 24 does not transmit the update notification to the first controller 100. The display completion notification will be described later.

Next, the situation image data writing unit 23 will be described. If the detector 21 detects the situation change of the device 300 after the update notification transmission unit 24 transmits the update notification and before a display completion notification indicating that display based on storage content of the storage area 400 is completed is received from the first controller 100, and if a process corresponding to a predetermined condition is not being executed in the second controller 200, the situation image data writing unit 23 generates situation image data for displaying a situation image that indicates the situation of the device 300, and writes the situation image data in the storage area 400. Specifically, this process is performed as follows.

The CPU 201 generates the situation image data when two conditions are satisfied.

(1) First Condition

The detection of the situation change of the device 300 after the update notification is transmitted and before the display completion notification is received corresponds to a first condition. The situation data or the situation image data is written in the storage area 400. The first controller 100 displays the situation image that indicates the situation of the device 300 in the UI 107 on the basis of the situation data or the situation image data written in the storage area 400, and is configured to transmit the display completion notification to the second controller 200 if the display of the situation image is completed. That is, the detection of the situation change of the device 300 after the update notification is transmitted and before the display completion notification is received means that the situation of the device 300 is changed in the middle of the process for displaying the situation image.

(2) Second Condition

The non-execution of the process corresponding to the predetermined condition in the second controller 200 corresponds to a second condition. For example, the predetermined condition refers to a condition corresponding to a process relating to control of the device 300. The process relating to the control of the device 300 is a process to be executed prior to the generation of the situation image data. If the process relating to the control of the device 300 is not being executed in the second controller 200, the CPU 201 determines that the process corresponding to the predetermined condition is not being executed in the second controller 200.

If the first condition and the second condition are satisfied, the CPU 201 generates the situation image data and writes the generated situation image data in the storage area 400. The situation image data corresponds to raster type image data that indicates a small image (so-called thumbnail) obtained by reducing an image during printing, an image that indicates the position of paper on a schematic diagram showing the structure of the image forming apparatus 1000, an image that indicates the amount of the remaining paper by a numerical value or a graph, and the like, for example. Here, the CPU 201 sets a data type flag "1" in the same bit as in the data type flag of the above-mentioned situation data so that the corresponding data is recognized as the situation image data.

Further, if the detector 21 detects the situation change of the device 300 after the update notification transmission unit 24 transmits the update notification and before the display completion notification is received, and if the process corresponding to the predetermined condition is being executed in the second controller 200, the situation data writing unit 22 writes the situation data in the storage area 400. That is, if the first condition is satisfied but the second condition is not satisfied, the CPU 201 writes the situation data in the storage area 400 without generation of the situation image data.

If the display completion notification is received after the situation image data is written in the storage area 400, if the detector 21 initially detects the situation change of the device 300 after the display completion notification is received, and if the process corresponding to the predetermined condition is not being executed in the second controller 200, the situation image data writing unit 23 generates the situation image data and writes the situation image data in the storage area 400.

Next, the first controller 100 will be described.

If update notification is received, the reading unit 11 reads the situation data or the situation image data from the storage area 400. As described above, if the situation data or the situation image data is written in the storage area 400, the update notification is transmitted from the second controller 200. If the update notification is received, the CPU 101 reads the data from the storage area 400.

Next, the generating unit 12 will be described. If the reading unit 11 reads the situation data, the generating unit 12 generates the situation image data for displaying the situation image based on the situation data. Specifically, if the data type flag included in the data read from the storage area 400 is "0", the CPU 101 determines that the corresponding data is the situation data, and if the data type flag is "1", the CPU 101 determines that the corresponding data is the situation image data. If it is determined that the corresponding data is the situation data, the CPU 101 generates the situation image data that is raster type image data that indicates a small image (so-called thumbnail) obtained by reducing an image during printing, an image that indicates the position of paper on a schematic diagram showing the structure of the image forming apparatus 1000, an image that indicates the amount of the remaining paper by a numerical value or a graph, and the like, for example, on the basis of the situation data.

Next, the display unit 13 will be described. The display unit 13 displays the situation image based on the situation image data generated by the generating unit 12 or the situation image based on the situation image data read by the reading unit 11. Specifically, if the data type flag is "0", the CPU 101 displays the situation image based on the situation image data generated from the situation data on the touch panel of the UI 107. In contrast, if the data type flag is "1", the CPU 101 displays the situation image based on the situation image data read from the storage area 400 on the touch panel.

Next, the display completion notification transmission unit 14 will be described. If the display of the situation image using the display unit 13 is completed, the display completion notification transmission unit 14 transmits a display completion notification to the second controller 200. Specifically, if the display of the situation image is completed, the CPU 101 transmits the display completion notification to the second controller 200, regardless of whether the situation image data is generated from the situation data or is read from the storage area 400.

Operation

Next, an operation of the image forming apparatus 1000 will be described. The operation is started when a print instruction is input to the image forming apparatus 1000.

Operation of First Controller

Figure 3:
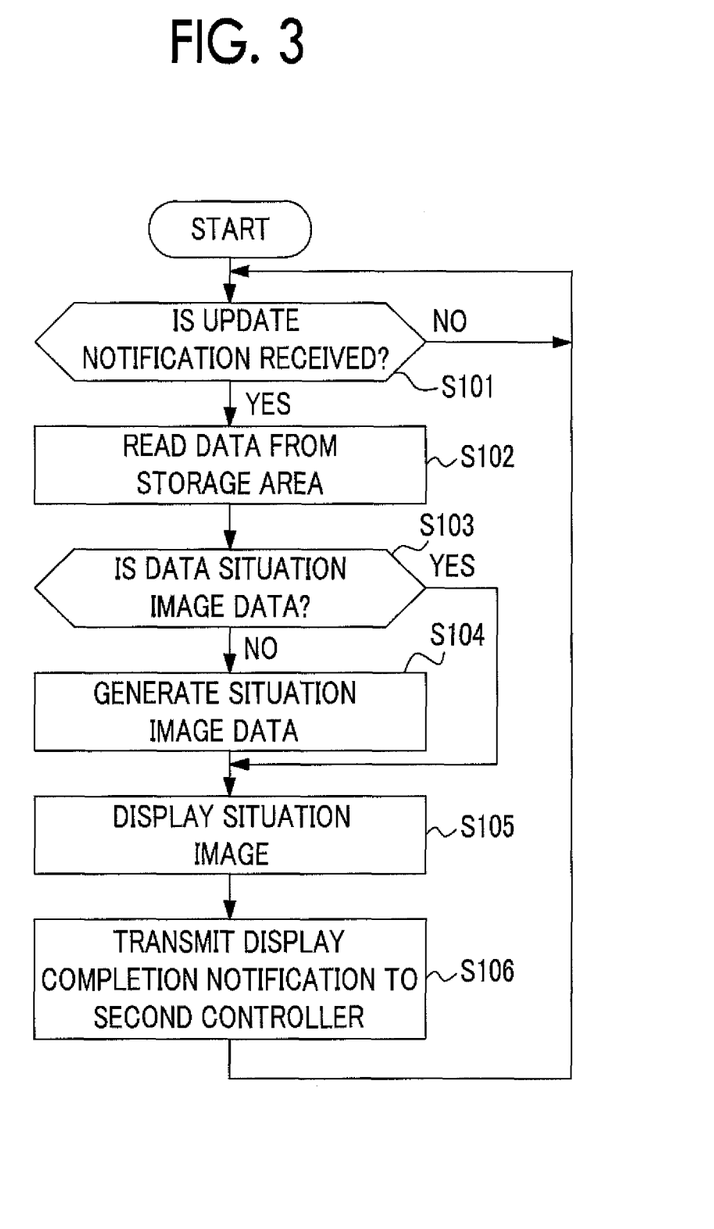
FIG. 3 is a flowchart illustrating a procedure of a process executed by a first controller.

FIG. 3 is a flowchart illustrating a procedure of a process executed by the first controller 100.

In step S101, the CPU 101 as the reading unit 11 periodically determines whether an update notification is received. If it is determined that the update notification is received (YES in step S101), the procedure goes to step S102.

In step S102, the CPU 101 as the reading unit 11 reads data from the storage area 400. This data is the situation data or the situation image data.

In step S103, the CPU 101 determines whether the data read from the storage area 400 is the situation image date by the data type flag. If it is determined that the data is the situation image data (YES in step S103), the procedure goes to step S105, and if it is determined that the data is not the situation image data (NO in step S103), the procedure goes to step S104.

In step S104, the CPU 101 as the generating unit 12 generates the situation image data on the basis of the situation data read from the storage area 400.

In step S105, the CPU 101 as the display unit 13 displays a situation image based on the situation image data on the touch panel of the UI 107.

In step S106, the CPU 101 as the display completion notification transmission unit 14 transmits the display completion notification to the second controller 200.

Operation of Second Controller

Figure 4:
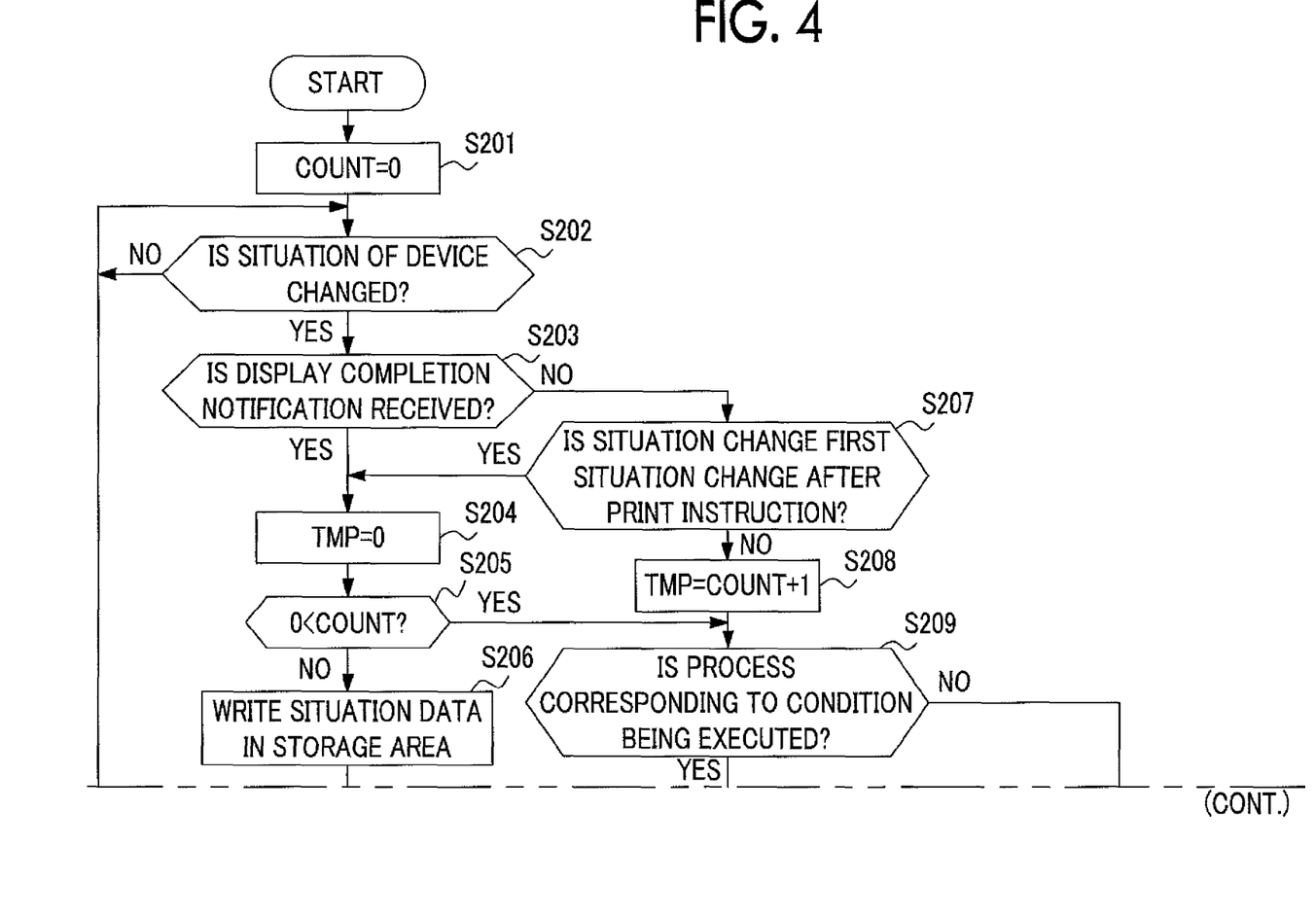
FIG. 4 is a flowchart illustrating a procedure of a process executed by a second controller.

FIG. 4 is a flowchart illustrating a procedure of a process executed by the second controller 200.

In step S201, the CPU 201 sets 0 in a counter COUNT.

In step S202, the CPU 201 as the detector 21 periodically obtains the situation data from the device 300, and determines whether the situation of the device 300 is changed, on the basis of the situation data. If it is determined that the situation of the device 300 is changed (YES in step S202), the procedure goes to step S203.

In step S203, the CPU 201 determines whether the display completion notification is received after the update notification is transmitted. If it is determined that the display completion notification is received (YES in step S203), the procedure goes to step S204, and if it is determined that the display completion notification is not received (NO in step S203), the procedure goes to step S207.

In step S204, the CPU 201 sets 0 in a counter TMP.

In step S205, the CPU 201 determines whether the value of the counter COUNT is larger than 0. If the value is 0 (NO in step S205), the procedure goes to step S206, and if the value is larger than 0 (YES in step S205), the procedure goes to step S209.

In step S206, the CPU 201 as the situation data writing unit 22 writes the situation data in the storage area 400.

In contrast, in step S207, the CPU 201 determines whether the situation change of the device detected in step S202 is the first situation change after the print instruction is input. If it is determined that the change is the first situation change (YES in step S207), the procedure goes to step S204, and if it is determined that the change is not the first situation change (NO in step S207), the procedure goes to step S208.

In step S208, the CPU 201 sets a value obtained by adding 1 to the value of the counter COUNT in the counter TMP.

In step S209, the CPU 201 determines whether the process corresponding to the predetermined condition (for example, the process relating to the control of the device 300) is being executed in the second controller 200. If it is determined that the process is being executed (YES in step S209), the procedure goes to step S210, and if it is determined that the process is not being executed (NO in step S209), the procedure goes to step S211.

In step S210, the CPU 201 as the situation data writing unit 22 writes the situation data in the storage area 400.

In contrast, in step S211, the CPU 201 as the situation image data writing unit 23 generates the situation image data on the basis of the situation data.

In step S212, the CPU 201 as the situation image data writing unit 23 writes the generated situation image data in the storage area 400.

In step S213, the CPU 201 determines whether the value of the counter TMP is 0. If it is determined that the value is 0 (YES in step S213), the procedure goes to step S214, and if it is determined that the value is not 0 (NO in step S213), the procedure goes to step S215.

In step S214, the CPU 201 as the update notification transmission unit 24 transmits the update notification to the first controller 100.

In step S215, the CPU 201 sets the value of the counter TMP in the counter COUNT, and the procedure goes to step S202.

Next, a specific example of the operation of the image forming apparatus 1000 will be described.

First Specific Example

Figure 5:
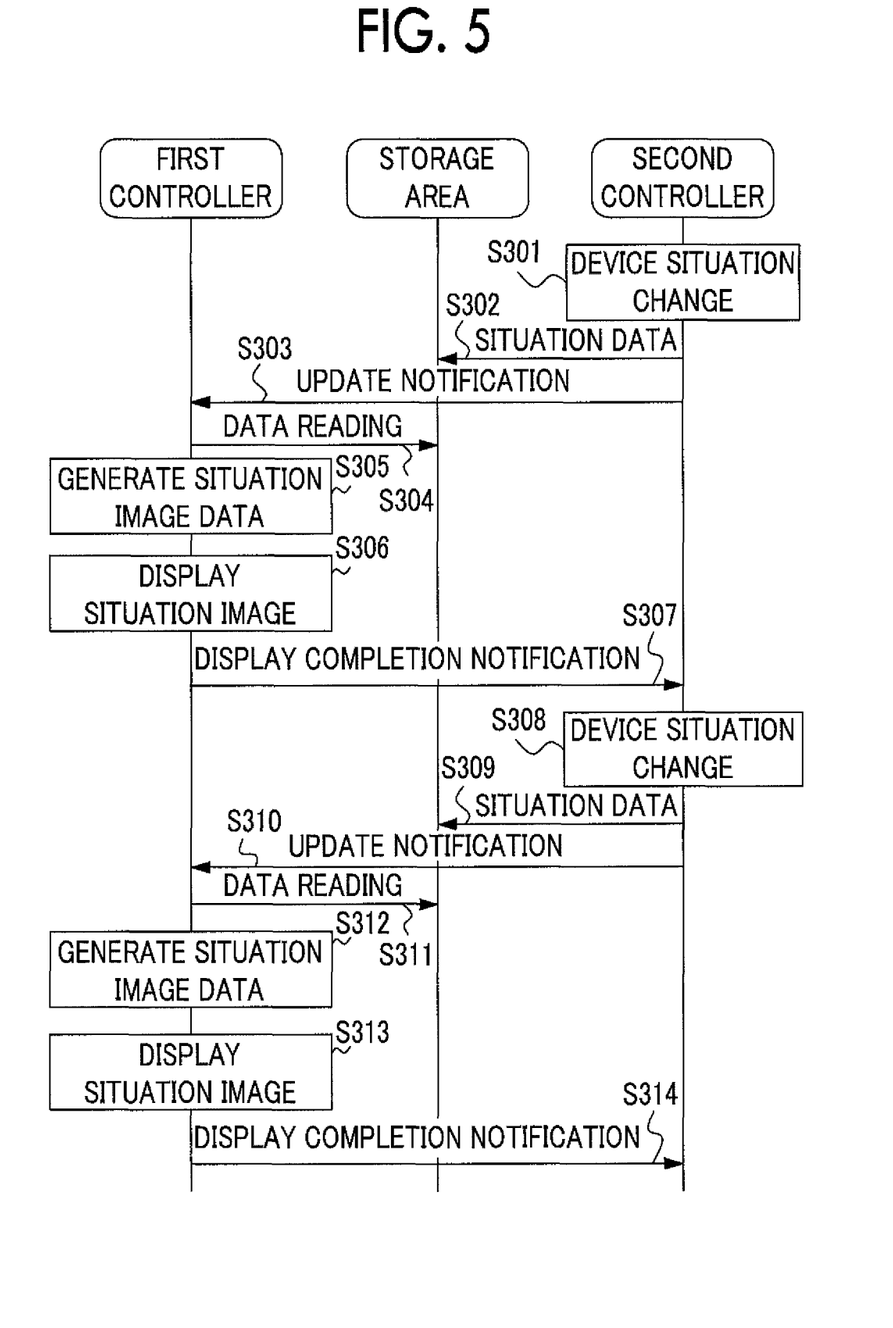
FIG. 5 is a sequence diagram illustrating a first specific example.

FIG. 5 is a sequence diagram illustrating a first specific example. The first specific example is a basic operation of the present exemplary embodiment.

In step S301, the second controller 200 detects a situation change of the device 300 (COUNT=0 in step S201 and YES in step S202 in FIG. 4).

In step S302, the second controller 200 writes the situation data in the storage area 400 (NO in step S203, YES in step S207, TMP=0 in step S204 and NO in step S205, and step S206 in FIG. 4).

In step S303, the second controller 200 transmits an update notification to the first controller 100 (YES in step S213 and COUNT=0 in step S214 and step S215 in FIG. 4, and YES in step S101 in FIG. 3).

In step S304, the first controller 100 reads data from the storage area 400 (step S102 in FIG. 3). This data is the situation data (NO in step S103 in FIG. 3).

In step S305, the first controller 100 generates situation image data on the basis of the situation data (step S104 in FIG. 3).

In step S306, the first controller 100 displays a situation image based on the situation image data (step S105 in FIG. 3).

In step S307, the first controller 100 transmits a display completion notification to the second controller 200 (step S106 in FIG. 3).

In step S308, the second controller 200 detects a situation change of the device (YES in step S202 in FIG. 4).

In step S309, the second controller 200 writes the situation data in the storage area 400 (YES in step S203, TMP=0 in step S204 and NO in step S205, and step S206 in FIG. 4).

In step S310, the second controller 200 transmits an update notification to the first controller 100 (YES in step S213 and COUNT=0 in step S214 and step S215 in FIG. 4, and YES in step S101 in FIG. 3).

In step S311, the first controller 100 reads data from the storage area 400 (step S102 in FIG. 3). This data is the situation data (NO in step S103 in FIG. 3).

In step S312, the first controller 100 generates situation image data on the basis of the situation data (step S104 in FIG. 3).

In step S313, the first controller 100 displays a situation image based on the situation image data (step S105 in FIG. 3).

In step S314, the first controller 100 transmits a display completion notification to the second controller 200 (step S106 in FIG. 3).

Second Specific Example

Figure 6:
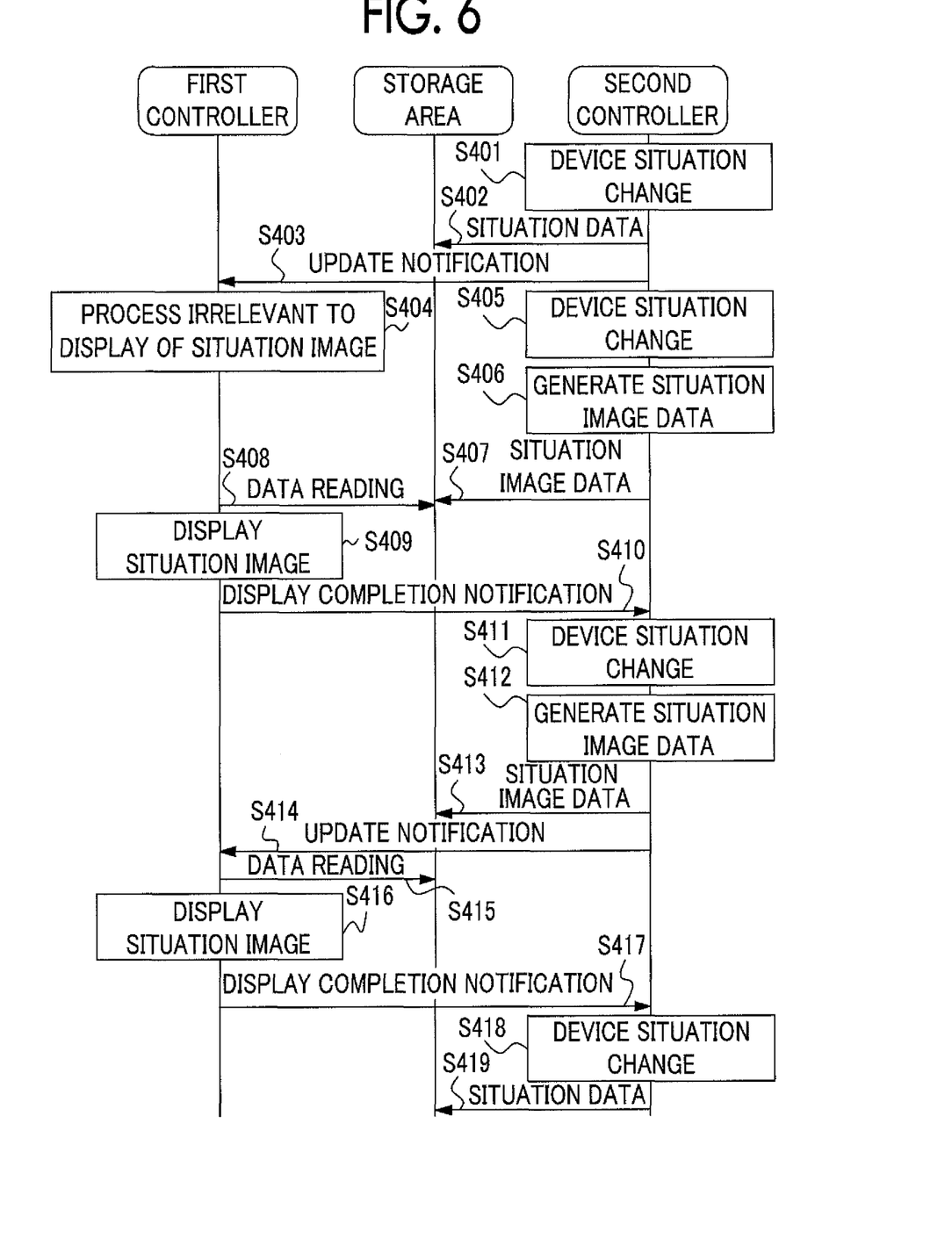
FIG. 6 is a sequence diagram illustrating a second specific example.

FIG. 6 is a sequence diagram illustrating a second specific example. The second specific example is an example in which the second controller 200 generates situation image data.

In step S401, the second controller 200 detects a situation change of the device 300 (COUNT=0 in step S201 and YES in step S202 in FIG. 4).

In step S402, the second controller 200 writes situation data in the storage area 400 (NO in step S203, YES in step S207, TMP=0 in step S204 and NO in step S205, and step S206 in FIG. 4).

In step S403, the second controller 200 transmits an update notification to the first controller 100 (YES in step S213 and COUNT=0 in step S214 and step S215 in FIG. 4, and YES in step S101 in FIG. 3).

In step S404, since the first controller 100 starts a process irrelevant to the situation image display, for example, the first controller 100 cannot read data from the storage area 400 until this process is finished.

In step S405, while the first controller 100 is executing the process of step S404, the second controller 200 detects a situation change of the device 300 (YES in step S202 in FIG. 4).

In step S406, the second controller 200 generates situation image data (NO in step S203, NO in step S207, TMP=1 in step S208 and NO in step S209, and step S211 in FIG. 4).

In step S407, the second controller 200 writes the generated situation image data in the storage area 400 (NO in step S212 and step S213 and COUNT=1 in step S215 in FIG. 4).

In step S408, since the process of step S404 in the first controller 100 is finished, the first controller 100 reads data from the storage area 400 (step S102 in FIG. 3). This data is the situation image data (YES in step S103 in FIG. 3).

In step S409, the first controller 100 displays a situation image based on the read situation image data (step S105 in FIG. 3).

In step S410, the first controller 100 transmits a display completion notification to the second controller 200 (step S106 in FIG. 3).

In step S411, the second controller 200 detects a situation change of the device 300 (YES in step S202 in FIG. 4).

In step S412, the second controller 200 generates situation image data (YES in step S203, TMP=0 in step S204, YES in step S205 and NO in step S209, and step S211 in FIG. 4).

In step S413, the second controller 200 writes the generated situation image data in the storage area 400 (step S212 in FIG. 4).

In step S414, the second controller 200 transmits an update notification to the first controller 100 (YES in step S213 and COUNT=0 in step S214 and step S215 in FIG. 4, and YES in step S101 in FIG. 3).

In step S415, the first controller 100 reads data from the storage area 400 (step S102 in FIG. 3). This data is the situation image data (YES in step S103 in FIG. 3).

In step S416, the first controller 100 displays a situation image based on the read situation image data (step S105 in FIG. 3).

In step S417, the first controller 100 transmits a display completion notification to the second controller 200 (step S106 in FIG. 3).

In step S418, the second controller 200 detects a situation change of the device 300 (YES in step S202 in FIG. 4).

In step S419, the second controller 200 writes situation data in the storage area 400 (YES in step S203, TMP=0 in step S204 and NO in step S205, and step S206 in FIG. 4).

Third Specific Example

Figure 7:
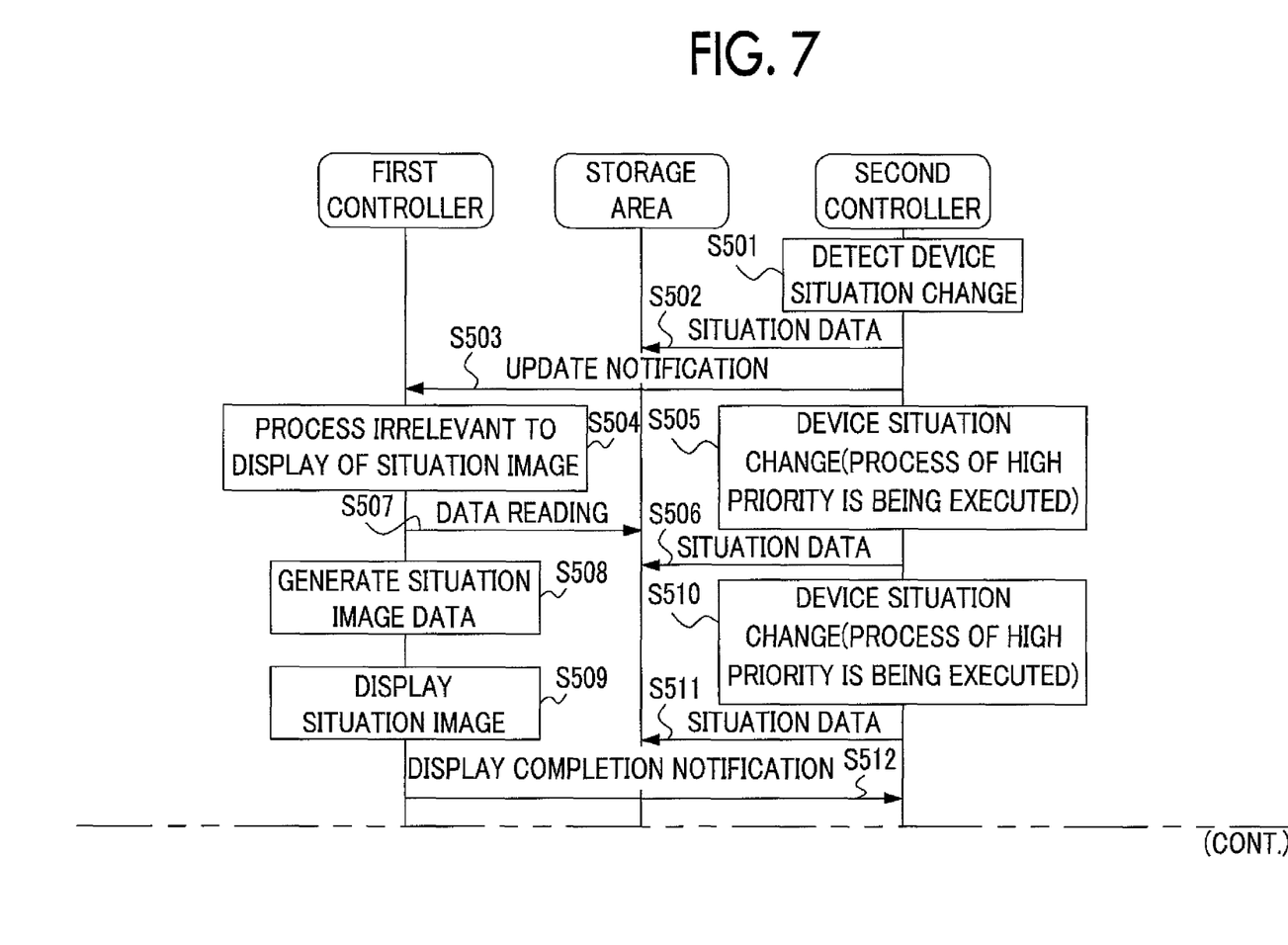
FIG. 7 is a sequence diagram illustrating a third specific example.

FIG. 7 is a sequence diagram illustrating a third specific example. The third specific example is an example in which the second controller 200 does not generate situation image data since the process corresponding to the predetermined condition is being executed in the second controller 200.

In step S501, the second controller 200 detects a situation change of the device 300 (COUNT=0 in step S201 and YES in step S202 in FIG. 4).

In step S502, the second controller 200 writes situation data in the storage area 400 (NO in step S203, YES in step S207, TMP=0 in step S204 and NO in step S205, and step S206 in FIG. 4).

In step S503, the second controller 200 transmits an update notification to the first controller 100 (YES in step S213 and COUNT=0 in step S214 and step S215 in FIG. 4, and YES in step S101 in FIG. 3).

In step S504, since the first controller 100 starts a process irrelevant to the situation image display, the first controller 100 cannot read data from the storage area 400 until this process is finished.

In step S505, while the first controller 100 is executing the process of step S504, the second controller 200 detects a situation change of the device 300 (YES in step S202 in FIG. 4). Here, since a process with priority higher than generation of the situation image data (for example, a process relating to the control of the device 300) is being executed in the second controller 200, the second controller 200 does not perform generation of the situation image data.

In step S506, the second controller 200 writes situation data in the storage area 400 (NO in step S203, NO in step S207, TMP=1 in step S208, YES in step S209, NO in step S210 and step S213, and COUNT=1 in step S215 in FIG. 4).

In step S507, since the process of step S504 in the first controller 100 is finished, the first controller 100 reads the data from the storage area 400 (step S102 in FIG. 3). This data is the situation data (NO in step S103 in FIG. 3).

In step S508, the first controller 100 generates situation image data based on the situation data (step S104 in FIG. 3).

In step S509, the first controller 100 displays a situation image based on the situation image data (step S105 in FIG. 3).

In step S510, the second controller 200 detects a situation change of the device 300 (YES in step S202 in FIG. 4). Here, since a process with priority higher than generation of the situation image data is being executed in the second controller 200, the second controller 200 does not perform the generation of the situation image data.

In step S511, the second controller 200 writes situation data in the storage area 400 (NO in step S203, NO in step 207, TMP=2 in step S208, YES in step S209, NO in step S210 and step 3213, and COUNT=2 in step S215 in FIG. 4).

In step S512, since the display of the situation image in step S509 is finished, the first controller 100 transmits a display completion notification to the second controller 200 (in step S106 in FIG. 3).

In step S513, since the first controller 100 starts a process irrelevant to the situation image display, the first controller 100 cannot read data from the storage area 400 until this process is finished.

In step S514, the second controller 200 detects a situation change of the device 300 (YES in step S202 in FIG. 4). Here, since a process with priority higher than generation of the situation image data is being executed in the second controller 200, the second controller 200 does not perform the generation of the situation image data.

In step S515, the second controller 200 writes situation data in the storage area 400 (YES in step S203, TMP=0 in step S204, YES in step S205, and YES in step S209, and step S210 in FIG. 4). In step S516, the second controller 200 transmits an update notification to the first controller 100 (YES in step S213, and COUNT=0 in step S214, and step 3215 in FIG. 4, and YES in step S101 in FIG. 3).

In step S517, since the first controller 100 starts a process irrelevant to the situation image display, the first controller 100 cannot read data from the storage area 400 until this process is finished.

In step S518, the second controller 200 detects a situation change of the device 300 (YES in step S202 in FIG. 4). Here, since a process with priority higher than generation of the situation image data is being executed in the second controller 200, the second controller 200 does not perform the generation of the situation image data.

In step S519, the second controller 200 writes situation data in the storage area 400 (NO in step S203, NO in step S207, TMP=1 in step S208, YES in step S209, NO in step S210 and step S213, and COUNT=1 in step S215 in FIG. 4).

In step S520, since the process of step S517 in the first controller 100 is finished, the first controller 100 reads data from the storage area 400 (step S102 in FIG. 3). This data is the situation data (NO in step S103 in FIG. 3).

In step S521, the first controller 100 generates situation image data based on the situation data (step S104 in FIG. 3).

In step S522, the first controller 100 displays a situation image based on the situation image data (step S105 in FIG. 3).

As shown in the second specific example, in the present exemplary embodiment, if a processing capability for generating the situation image data in the first controller 100 is not sufficient, the second controller 200 generates the situation image data. According to the present exemplary embodiment, a display delay due to the situation change of the device 300 is reduced.

Further, in the present exemplary embodiment, if the process corresponding to the predetermined condition is not being executed in the second controller 200, the second controller 200 generates the situation image data, and if the process corresponding to the predetermined condition is being executed in the second controller 200, the second controller 200 does not generate the situation image data and writes the situation data in the storage area. According to the present exemplary embodiment, compared with a case where this configuration is not provided, the influence on the control of the device in the second controller 200 is reduced. Further, if the second controller 200 does not generate the situation image data, the storage content of the storage area 400 is updated to the latest situation data.

Further, in the present exemplary embodiment, if the situation data or the situation image data is written in the storage area 400 after the update notification is transmitted and before the display completion notification is received, the update notification is not transmitted. According to the present exemplary embodiment, compared with a case where this configuration is not provided, the amount of communication from the second controller 200 to the first controller 100 is suppressed.

Further, in the present exemplary embodiment, if the display completion notification is received after the situation image data is written in the storage area 400, if the situation change of the display 300 is firstly detected after the display completion notification is received, and if the process corresponding to the predetermined condition is not being executed in the second controller 200, the second controller 200 generates the situation image data. According to the present exemplary embodiment, compared with a case where this configuration is not provided, a load increase of the first controller 100 after the situation image display is completed is suppressed.

Further, as shown in the third specific example, in the present exemplary embodiment, if the process corresponding to the predetermined condition is being executed in the second controller 200, the second controller 200 writes the situation data in the storage area 400. According to the present exemplary embodiment, even if the second controller 200 cannot generate the situation image data, the storage content of the storage area 400 is updated to the latest situation data.

MODIFICATION EXAMPLES

The exemplary embodiments may be modified as follows. Further, the exemplary embodiment and the modification examples may be combined. Furthermore, the plural modification examples may be combined.

First Modification Example

In the exemplary embodiment, an example has been described in which the second controller writes the situation data in the storage area 400 without generation of the situation image data if the first condition (the detection of the situation change of the device 300 after the update notification is transmitted and before the display completion notification is received) is satisfied but the second condition (the non-execution of the process corresponding to the predetermined condition in the second controller 200) is not satisfied, but even if the first condition is satisfied but the second condition is not satisfied, the second controller may generate the situation image data.

Second Modification Example

In the exemplary embodiment, an example has been described in which the update notification is not transmitted to the first controller 100 when the situation data or the situation image data is written in the storage area 400 after the update notification is transmitted and before the display completion notification is received, but the update notification may be unconditionally transmitted to the first controller 100 when the situation data or the situation image data is written in the storage area 400.

Third Modification Example

It is preferable that the writing of the situation data or the situation image data in the storage area 400 be overwriting rather than an appending addition. In other words, the situation data or the situation image data may be updated to the latest data on the storage area 400.

Fourth Modification Example

In the exemplary embodiment, Linux is used as an example of the OS executed by the first controller 100, but the OS executed by the first controller 100 may be an OS in addition to Linux.

In the exemplary embodiment, the RTOS is used as an example of the OS executed by the second controller 200, but the OS executed by the second controller 200 may be a general-purpose OS such as Linux.

In the exemplary embodiment, an example has been described in which the first controller and the second controller are respectively realized as exclusive hardware and software, but the first controller and the second controller may be realized as virtual machines that execute Linux or an RTOS using a single CPU.

Fifth Modification Example

In the exemplary embodiment, the image scanner 301 and the printer 302 are used as the examples of the device 300 provided in the image forming apparatus 1000, but the device 300 may include any type of device.

Figure 8:
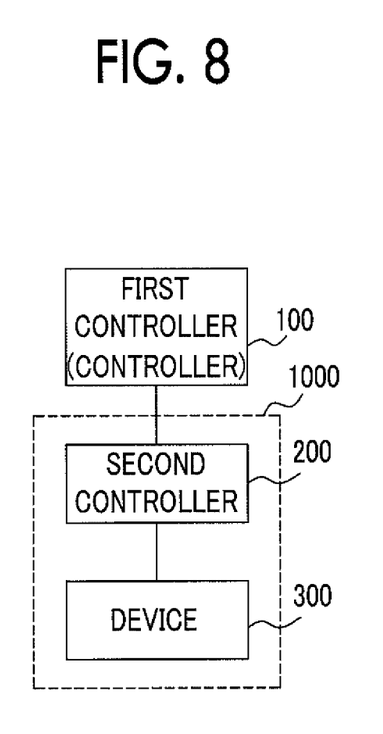
FIG. 8 is a diagram illustrating a configuration in which a first controller is separated from the image forming apparatus.

In the exemplary embodiment, an example has been described in which the image forming apparatus 1000 includes the first controller (controller) 100, the second controller (device controller) 200 and the device 300, but as shown in FIG. 8, the first controller 100 may be separated from the image forming apparatus 1000 to form a controller, and the first controller 100 and the second controller 200 may be connected to each other by a communication line.

In the exemplary embodiment, an example has been described in which the CPU 101 of the first controller 100 and the CPU 201 of the second controller 200 execute the program to operate the image forming apparatus 1000, but the program may be provided which is recorded on a computer-readable medium such as an optical recording medium or a semiconductor memory, or may be read from the recording medium to be stored on the HDD 104 or the like. Further, the program may be provided through an electric telecommunication line. Further, the same functions as those of the exemplary embodiment may be mounted by hardware.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An electronic apparatus comprising:
a first controller;
a second controller that is controlled by the first controller;
a device that is controlled by the second controller; and
a storage area,
wherein the second controller includes:
a detector that detects a situation change of the device;
a situation data writing unit that writes situation data indicating the situation of the device in the storage area when the detector detects the situation change of the device;
an update notification transmission unit that transmits an update notification to the first controller if the writing to the storage area is performed; and
a situation image data writing unit that generates situation image data for displaying a situation image indicating the situation of the device when the detector detects the situation change of the device after the update notification transmission unit transmits the update notification and before a display completion notification indicating that display based on storage content of the storage area is completed is received from the first controller, and writes the situation image data in the storage area, and
wherein the first controller includes:
a reading unit that reads the situation data or the situation image data from the storage area when the update notification is received;
a generating unit that generates the situation image data for displaying the situation image based on the situation data when the reading unit reads the situation data;

a display unit that displays the situation image based on the situation image data generated by the generating unit or the situation image based on the situation image data read by the reading unit; and a display completion notification transmission unit that transmits the display completion notification to the second controller if the display of the situation image in the display unit is completed.

2. The electronic apparatus according to claim 1,
wherein if the detector detects the situation change of the device after the update notification transmission unit transmits the update notification and before the display completion notification is received, and if a process corresponding to a predetermined condition is not being executed in the second controller, the situation image data writing unit generates the situation image data and writes the situation image data in the storage area.

3. The electronic apparatus according to claim 2,
wherein if the detector detects the situation change of the device after the update notification transmission unit transmits the update notification and before the display completion notification is received, and if the process corresponding to the predetermined condition is being executed in the second controller, the situation data writing unit writes the situation data in the storage area.

4. The electronic apparatus according to claim 3,
wherein if the situation data or the situation image data is written in the storage area after the update notification is transmitted and before the display completion notification is received, the update notification transmission unit does not transmit the update notification to the first controller.

5. The electronic apparatus according to claim 4,
wherein if the display completion notification is received after the situation image data is written in the storage area, if the detector firstly detects the situation change of the device after the display completion notification is received, and if the process corresponding to the predetermined condition is not being executed in the second controller, the situation image data writing unit generates the situation image data, and writes the situation image data in the storage area.

6. The electronic apparatus according to claim 3,
wherein if the display completion notification is received after the situation image data is written in the storage area, if the detector firstly detects the situation change of the device after the display completion notification is received, and if the process corresponding to the predetermined condition is not being executed in the second controller, the situation image data writing unit generates the situation image data, and writes the situation image data in the storage area.

7. The electronic apparatus according to claim 2,
wherein if the situation data or the situation image data is written in the storage area after the update notification is transmitted and before the display completion notification is received, the update notification transmission unit does not transmit the update notification to the first controller.

8. The electronic apparatus according to claim 7,
wherein if the display completion notification is received after the situation image data is written in the storage area, if the detector firstly detects the situation change of the device after the display completion notification is received, and if the process corresponding to the predetermined condition is not being executed in the second controller, the situation image data writing unit generates the situation image data, and writes the situation image data in the storage area.

9. The electronic apparatus according to claim 2,
wherein if the display completion notification is received after the situation image data is written in the storage area, if the detector firstly detects the situation change of the device after the display completion notification is received, and if the process corresponding to the predetermined condition is not being executed in the second controller, the situation image data writing unit generates the situation image data, and writes the situation image data in the storage area.

10. The electronic apparatus according to claim 1,
wherein if the situation data or the situation image data is written in the storage area after the update notification is transmitted and before the display completion notification is received, the update notification transmission unit does not transmit the update notification to the first controller.

11. The electronic apparatus according to claim 10,
wherein if the display completion notification is received after the situation image data is written in the storage area, if the detector firstly detects the situation change of the device after the display completion notification is received, and if a process corresponding to a predetermined condition is not being executed in the second controller, the situation image data writing unit generates the situation image data, and writes the situation image data in the storage area.

12. The electronic apparatus according to claim 1,
wherein if the display completion notification is received after the situation image data is written in the storage area, if the detector firstly detects the situation change of the device after the display completion notification is received, and if a process corresponding to a predetermined condition is not being executed in the second controller, the situation image data writing unit generates the situation image data, and writes the situation image data in the storage area.

13. An image forming apparatus comprising:
a first controller;
a second controller that is controlled by the first controller;
a device that is controlled by the second controller and forms an image based on image data; and
a storage area,
wherein the second controller includes:
   a detector that detects a situation change of the device,
   a situation data writing unit that writes situation data indicating the situation of the device in the storage area when the detector detects the situation change of the device,
   an update notification transmission unit that transmits an update notification to the first controller if the writing to the storage area is performed, and
   a situation image data writing unit that generates situation image data for displaying a situation image indicating the situation of the device when the detector detects the situation change of the device after the update notification transmission unit transmits the update notification and before a display completion notification indicating that display based on storage content of the storage area is completed is received from the first controller, and writes the situation image data in the storage area, and
wherein the first controller includes:

a reading unit that reads the situation data or the situation image data from the storage area when the update notification is received, a generating unit that generates the situation image data for displaying the situation image based on the situation data when the reading unit reads the situation data, a display unit that displays the situation image based on the situation image data generated by the generating unit or the situation image based on the situation image data read by the reading unit, and a display completion notification transmission unit that transmits the display completion notification to the second controller if the display of the situation image in the display unit is completed.

14. A non-transitory computer readable medium storing a program causing a computer, controlled by a controller that includes a reading unit that reads situation data or situation image data from a storage area when an update notification is received, a generating unit that generates the situation image data for displaying a situation image based on the situation data when the reading unit reads the situation data, a display unit that displays the situation image based on the situation image data generated by the generating unit or the situation image based on the situation image data read by the reading unit, and a display completion notification transmission unit that transmits a display completion notification if the display of the situation image in the display unit is completed, to function as:

a detector that detects a situation change of a device;

a situation data writing unit that writes situation data indicating the situation of the device in the storage area when the detector detects the situation change of the device;

an update notification transmission unit that transmits an update notification to the controller if the writing to the storage area is performed; and a situation image data writing unit that generates the situation image data for displaying the situation image indicating the situation of the device when the detector detects the situation change of the device after the update notification transmission unit transmits the update notification and before the display completion notification indicating that display based on storage content of the storage area is completed is received from the controller, and writes the situation image data in the storage area.

\* \* \* \* \*